2,872,469
Patented Feb. 3, 1959

2,872,469
METAL SALTS OF ETHIONINE

Donna Stevens, Concord, Calif., assignor to The Dow Chemical Company, Midland, Mich., a corporation of Delaware No Drawing. Application January 23, 1956
Serial No. 560,896

5 Claims. (Cl. 260—429)

The present invention is concerned with the bivalent metal salts of ethionine of the formula

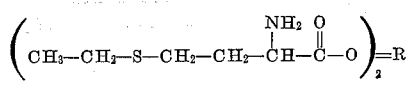
$$\left(CH_3-CH_2-S-CH_2-CH_2-\overset{NH_2}{\underset{|}{C}H}-\overset{O}{\underset{\|}{C}}-O\right)_2 = R$$

wherein R represents zinc, copper, manganese, cadmium or lead. These novel compounds are crystalline solid materials which are somewhat soluble in many common organic solvents and of very low solubility in water. They are valuable as intermediates for the preparation of more complex organic materials. They have also been found particularly useful as parasiticides and are adapted to be employed as active toxic constituents of germicide and disinfectant compositions for the control of many bacterial and fungal organisms.

The new compounds may be prepared by mixing or blending together ethionine, an alkali metal hydroxide and a suitable heavy metal salt such as the zinc, copper, manganese, cadmium or lead salts of hydrochloric, sulfuric or acetic acid. The contacting and mixing of the reagents is carried out in water as the reaction medium. Good results are obtained when employing stoichiometric proportions of the reagents. The reaction takes place readily at temperatures of from 45° to 100° C. Following the reaction, the desired product precipitates in substantial purity when the pH of the reaction mixture is brought in the range of from 6 to 7. The precipitated product may be separated in conventional fashion such as decantation and filtration.

In carrying out the reaction, the ethionine and alkali metal hydroxide such as sodium hydroxide, potassium hydroxide or ammonium hydroxide may be mixed together in water as reaction medium. This aqueous solution is then mixed with the heavy metal salt reagent under suitable temperature conditions to effect the desired reaction.

In an alternative method of operation, ethionine and the heavy metal salt reagent are dispersed in water and the alkali metal hydroxide added thereto under suitable temperature conditions. The desired product precipitates in the reaction mixture as a crystalline solid when and if the pH of the reaction mixture is in the range of 6 to 7.

Copper ethionate may be prepared in an alternative method by mixing or blending ethionine with copper acetate in water as reaction medium. Good results are obtained in such method when one molecular proportion of ethionine is reacted with about one-half molecular proportion of copper acetate. The conditions of reaction are as previously described. During the reaction, copper ethionate precipitates in the reaction mixture as a crystalline solid. The product may be separated by filtration.

The ethionine to be employed as a starting material as above described may be prepared by the hydrolysis of 5-(2-ethylmercaptoethyl) hydantoin or ethionine nitrile. The ethionine may be separated in substantial purity from the resulting hydrolysate solutions by conventional methods.

In the preparation of the ethionates of the present invention it has been found unnecessary to employ pure ethionine. Thus, the method may be carried out when employing the crude hydrolysate solution mentioned above. In such method, the crude hydrolysate is deaminated by heating at a temperature at which ammonia is driven off and under alkaline conditions in the hydrolysate. The deaminated mixture is then acidified to a pH below seven and decarbonated by heating at a temperature at or near the boiling point of the mixture. The deaminated and decarbonated hydrolysate may then be treated with an alkali metal hydroxide and heavy metal salt to produce the desired ethionate compound. The latter product precipitates in substantially pure form when and if the pH of the solution is in the range of from 6 to 7.

The following examples illustrate the invention and are not to be construed as limiting.

Example 1.—Zinc ethionate

An aqueous solution of crude ethionine, obtained directly from the alkaline hydrolysis of 5-(2-ethylmercaptoethyl) hydantoin at a pH of 12, was heated until ammonia evolution was no longer detected. The remaining solution was acidified to about pH 3 with hydrochloric acid and heated again.

A portion of the above prepared solution containing about one-tenth mole of ethionine was mixed with 0.05 mole of zinc chloride and the resulting mixture neutralized to a pH of about 7 by the addition of one-tenth mole of sodium hydroxide. The neutralization was carried out at a temperature of about 80° C. During the neutralization, a zinc ethionate product precipitated in the mixture as a white crystalline solid. The latter was separated by filtration, washed with water and dried. The dried product had a zinc content of 17.04 percent and a sulfur content of 16.3 percent as compared with theoretical contents for $C_{12}H_{24}ZnN_2O_4S_2$ of 16.8 and 16.5 percent respectively.

Example 2.—Cupric ethionate 16.3 grams (0.10 mole) of ethionine was dissolved in 200 milliliters of boiling water and the resulting solution added with stirring to 10 grams (0.05 mole) of cupric acetate monohydrate dissolved in 100 milliliters of hot water. During the addition, a cupric ethionate product precipitated in the reaction mixture as a crystalline solid. Following the addition, the reaction mixture was heated with stirring for five minutes and thereafter filtered and the residue from the filtration washed with water and dried. The dried product weighed 18.5 grams. When the filtrate was treated with 0.1 mole of aqueous ammonia, 0.7 additional gram of cupric ethionate was obtained. The two products were thereafter combined and found to contain 16.3 percent copper as compared to a theoretical content for $C_{12}H_{24}CuN_2O_4S_2$ of 16.4 percent.

Example 3.—Cadmium ethionate 0.1 mole of ethionine was dissolved in 200 milliliters of boiling water and the resulting solution added to 0.05 mole of a cadmium chloride hydrate ($CdCl_2 \cdot 2.5H_2O$) dissolved in 100 milliliters of water. Stirring was thereafter continued and the hot solution adjusted to a pH of from 6 to 7 by the addition of 0.1 mole of sodium hydroxide dissolved in 200 milliliters of warm water. During the addition of the alkali, a cadmium ethionate product precipitated in the mixture as a white crystalline solid. The latter product was separated by filtration, washed with water and dried. The dried product weighed 20.7 grams and contained 27.1 percent cadmium as compared to a theoretical content for $C_{12}H_{24}CdN_2O_4S_2$ of 25.8 percent.

*Example 4.—Manganese ethionate*

24.5 grams (0.15 mole) of ethionine dissolved in 300 milliliters of boiling water was added to 14.8 (0.075 mole) of manganese chloride tetrahydrate ($MnCl_2 \cdot 4H_2O$) dissolved in 100 milliliters of hot water. The latter mixture was brought to a pH of from 6 to 7 by the addition of 0.15 mole of sodium hydroxide dissolved in 30 milliliters of warm water. During the addition of the alkali, a crystalline solid product precipitated in the reaction mixture. The latter was separated by filtration, washed with water and dried. As a result of these operations there was obtained an 81 percent yield of manganese ethionate ($C_{12}H_{24}N_2O_4PbS_2$).

*Example 5.—Lead ethionate*

In a similar manner, ethionine, lead acetate and sodium hydroxide are mixed and blended together to obtain a lead ethionate product ($C_{12}H_{24}N_2O_4PbS_2$) as a crystalline solid having a molecular weight of 503.

The products of the preceding examples are adapted to be employed as active toxic constituents of liquid and dust compositions for the control of fungal organisms. In representative operations against Alternaria solani, 100 percent kills have been obtained with aqueous compositions containing 10 parts by weight of cupric ethionate per million parts of ultimate mixture.

We claim:

1. As a new composition of matter, a bivalent metal salt of ethionine, the metal substituent of said salt being selected from the group consisting of zinc, copper, manganese, cadmium and lead.
2. Zinc ethionate.
3. Cupric ethionate.
4. Manganese ethionate.
5. Cadmium ethionate.

References Cited in the file of this patent

UNITED STATES PATENTS

| | | |
|---|---|---|
| 2,527,366 | Livak et al. | Oct. 24, 1950 |
| 2,745,859 | Norton et al. | May 15, 1956 |

OTHER REFERENCES

Catch et al.: "Nature," 159, pp. 578–9 (1947).